(12) United States Patent
Takama et al.

(10) Patent No.: US 9,690,464 B2
(45) Date of Patent: Jun. 27, 2017

(54) TERMINAL DEVICE AND METHOD FOR SELECTING OBJECT

(71) Applicant: NTT DOCOMO, INC., Chiyoda-ku (JP)

(72) Inventors: Katsuyuki Takama, Chiyoda-ku (JP); Tsukasa Aoyama, Chiyoda-ku (JP); Yoonok Heo, Chiyoda-ku (JP); Sumin Kwak, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/778,940

(22) PCT Filed: Feb. 26, 2014

(86) PCT No.: PCT/JP2014/054712
§ 371 (c)(1),
(2) Date: Sep. 21, 2015

(87) PCT Pub. No.: WO2014/148215
PCT Pub. Date: Sep. 25, 2014

(65) Prior Publication Data
US 2016/0041726 A1    Feb. 11, 2016

(30) Foreign Application Priority Data

Mar. 21, 2013  (JP) ................................. 2013-058661

(51) Int. Cl.
| | | |
|---|---|---|
| G06F 3/0484 | (2013.01) | |
| G06F 3/0488 | (2013.01) | |
| G06F 3/041 | (2006.01) | |

(52) U.S. Cl.
CPC ........ *G06F 3/04842* (2013.01); *G06F 3/0412* (2013.01); *G06F 3/0416* (2013.01);
(Continued)

(58) Field of Classification Search
None
See application file for complete search history.

(56) References Cited

U.S. PATENT DOCUMENTS

| 6,243,419 B1 | 6/2001 | Satou et al. |
|---|---|---|
| 7,644,374 B2 | 1/2010 | Wong et al. |
| (Continued) | | |

FOREIGN PATENT DOCUMENTS

| JP | 10-108092 A | 4/1998 |
|---|---|---|
| JP | 2008-538038 A | 10/2008 |
| (Continued) | | |

OTHER PUBLICATIONS

Extended Search Report issued Apr. 8, 2016 in European Patent Application No. 14768594.5.
(Continued)

*Primary Examiner* — Kenneth B Lee, Jr.
(74) *Attorney, Agent, or Firm* — Oblon, McClelland, Maier & Neustadt, L.L.P.

(57) ABSTRACT

A terminal device to accurately define a selection range by an intuitive operation when an object is selected on a touch panel display. The terminal device includes a touch panel display for displaying an object and sensing proximity or contact of a finger, a coordinate sensing unit for detecting a coordinate value of an approaching position or a contacting position of the finger to the touch panel display, and an object selecting unit. The object selecting unit sets a selection range defined by the coordinate values of the plurality of fingers and selects the object included in the selection range when the coordinate values of the plurality of fingers detected by the coordinate sensing unit have been concurrently maintained for a predetermined time.

9 Claims, 22 Drawing Sheets

(52) U.S. Cl.
CPC ............. *G06F 3/04883* (2013.01); *G06F 2203/04104* (2013.01); *G06F 2203/04808* (2013.01)

(56) References Cited

U.S. PATENT DOCUMENTS

| | | | |
|---|---|---|---|
| 8,375,335 | B2 | 2/2013 | Wong et al. |
| 9,310,993 | B2 | 4/2016 | Choi |
| 2010/0097338 | A1 | 4/2010 | Miyashita et al. |
| 2010/0235726 | A1* | 9/2010 | Ording ................ G06F 1/1626 715/234 |
| 2010/0235729 | A1 | 9/2010 | Kocienda et al. |
| 2010/0235734 | A1 | 9/2010 | Ording et al. |
| 2010/0235735 | A1 | 9/2010 | Ording et al. |
| 2010/0235770 | A1 | 9/2010 | Ording et al. |
| 2010/0235778 | A1 | 9/2010 | Kocienda et al. |
| 2010/0235783 | A1 | 9/2010 | Ording et al. |
| 2010/0235784 | A1 | 9/2010 | Ording et al. |
| 2010/0235785 | A1 | 9/2010 | Ording et al. |
| 2010/0235793 | A1 | 9/2010 | Ording et al. |
| 2012/0272157 | A1 | 10/2012 | Tajima et al. |

FOREIGN PATENT DOCUMENTS

| | | |
|---|---|---|
| JP | 2010-97473 A | 4/2010 |
| JP | 2010-130214 A | 6/2010 |
| JP | 2012-504837 A | 2/2012 |
| JP | 2012-521048 A | 9/2012 |
| JP | 2012-226531 A | 11/2012 |
| JP | 2013-8201 A | 1/2013 |

OTHER PUBLICATIONS

International Preliminary Report on Patentability and Written Opinion issued Oct. 1, 2015 in PCT/JP2014/054712 (submitting English translation only, filed Feb. 26, 2014 ).

International Search Report Issued May 27, 2014 in PCT/JP14/054712 Filed Feb. 26, 2014.

* cited by examiner

*Fig.2*

| OPERATING TOOL | DETECTION TYPE | COORDINATE VALUE |
|---|---|---|
| 1 | PROXIMITY | (X1,Y1) |
| 2 | PROXIMITY | (X2,Y2) |

*Fig.6*
(a)
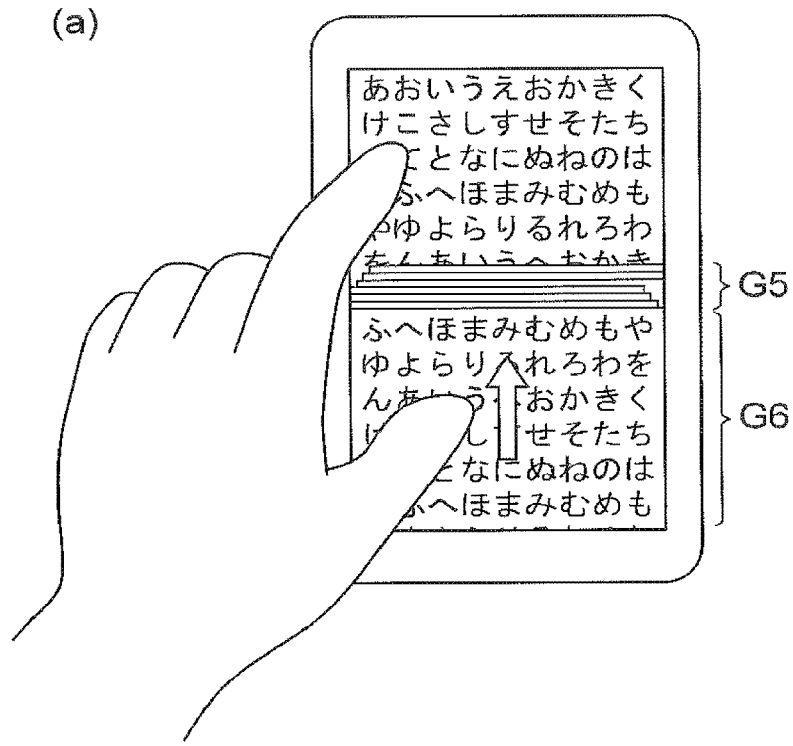
(b)
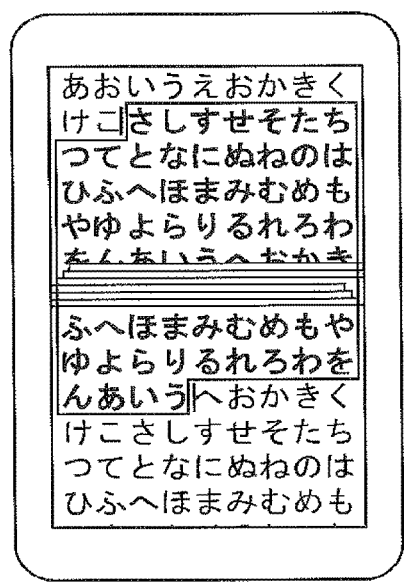

*Fig.7*

| OPERATING TOOL | DETECTION TYPE | COORDINATE VALUE |
|---|---|---|
| 1 | PROXIMITY | (X1,Y1) |
| 2 | PROXIMITY | (X2,Y2) |
| 3 | PROXIMITY | (X3,Y3) |
| 4 | PROXIMITY | (X4,Y4) |

Fig.9
(a)
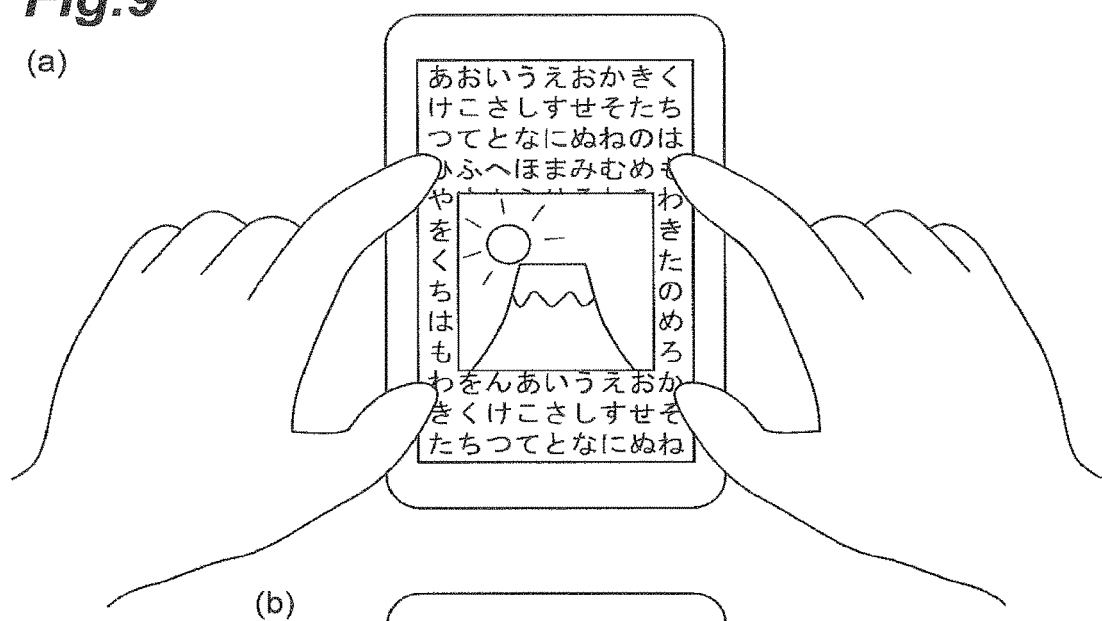
(b)
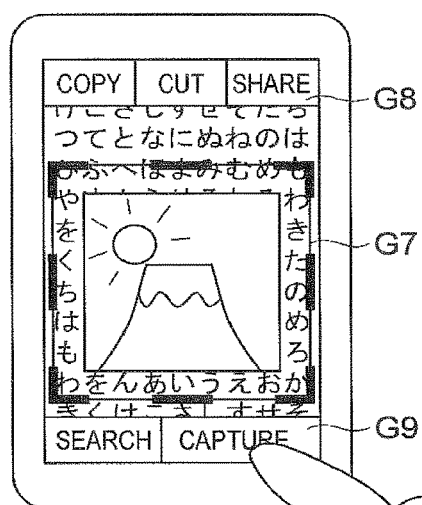

*Fig.16*
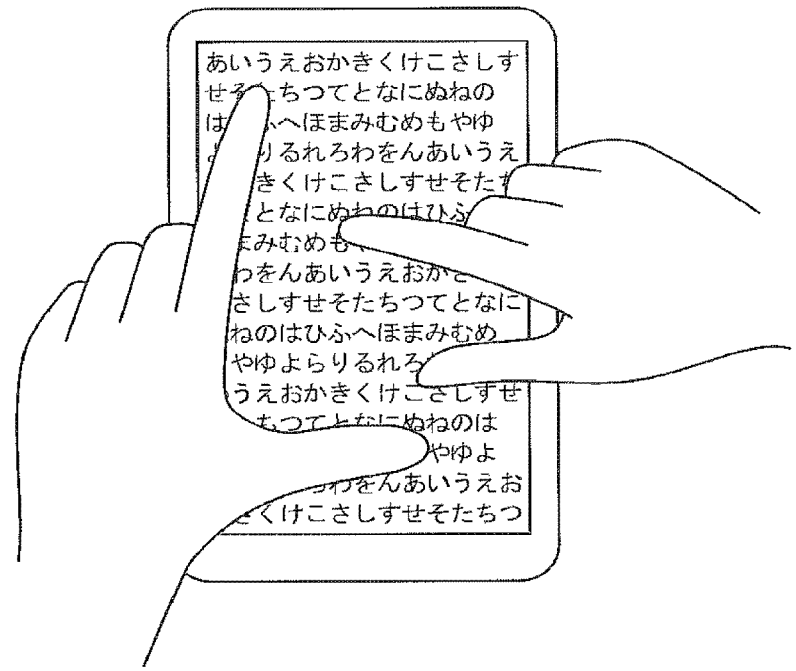
(a)
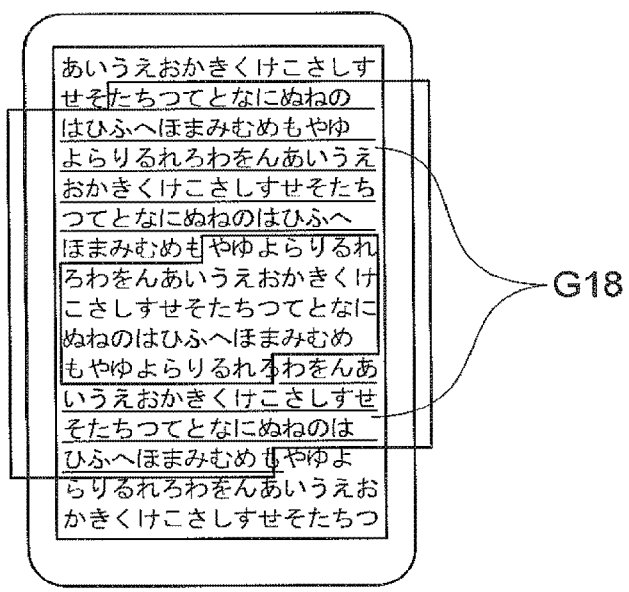
(b)

*Fig.17*
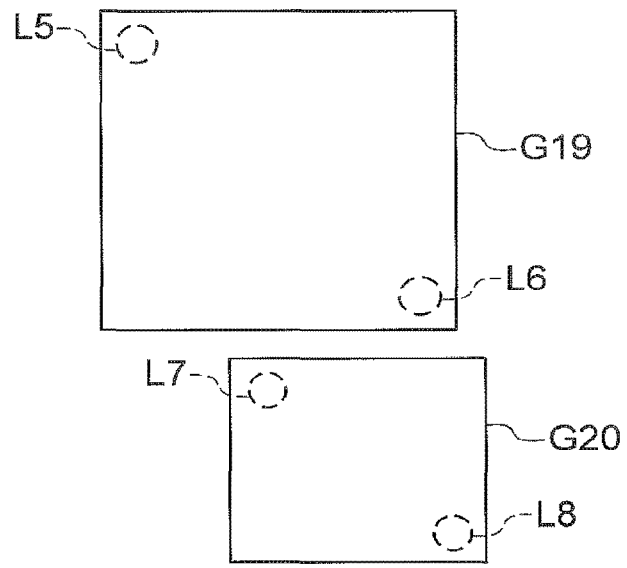
(a)
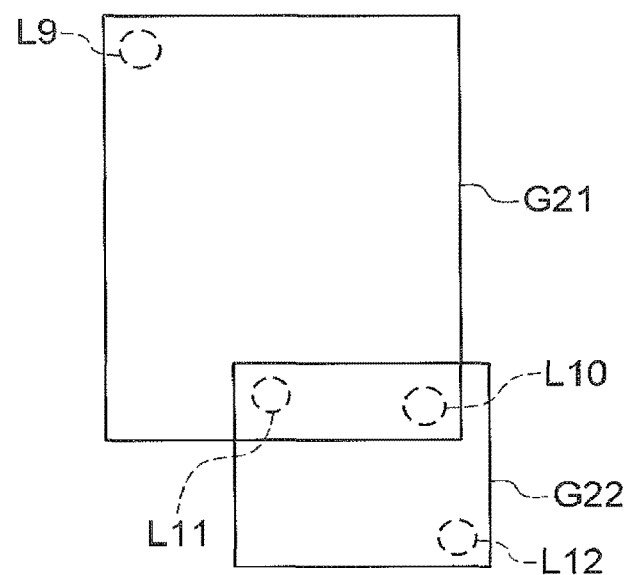
(b)

(a) (b)

*Fig.19*
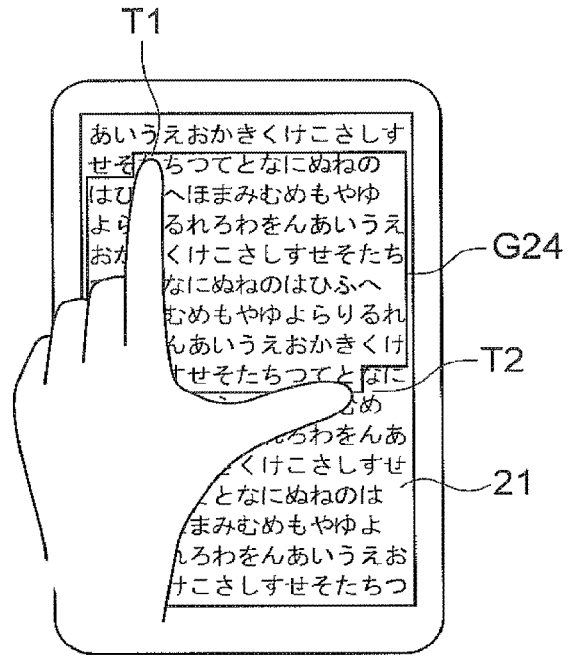
(a)
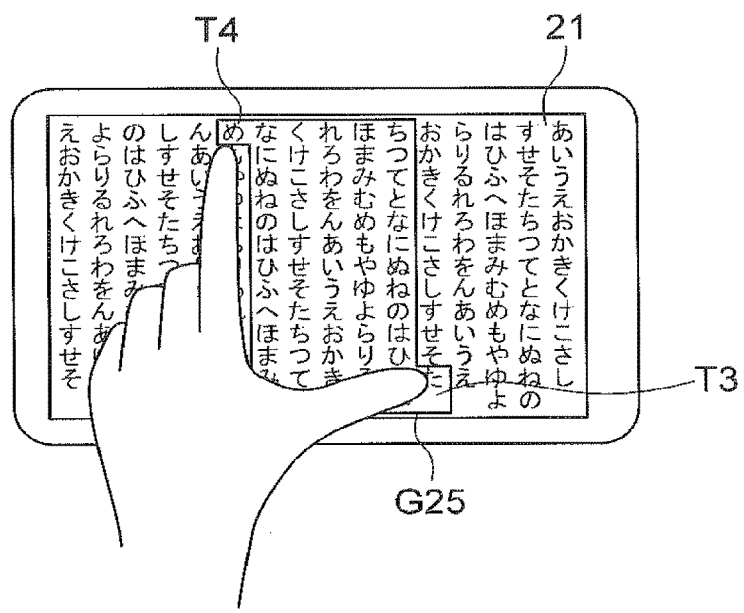
(b)

*Fig.20*
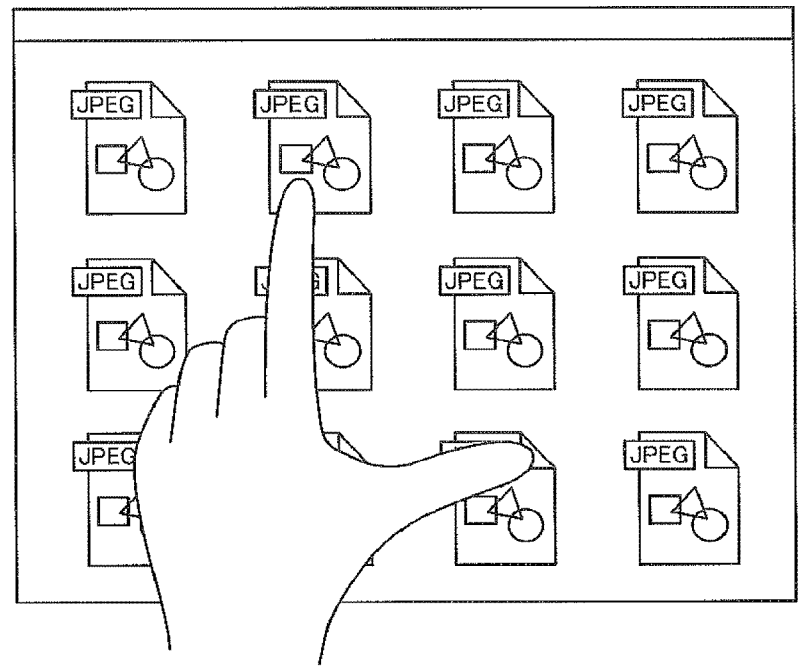
(a)
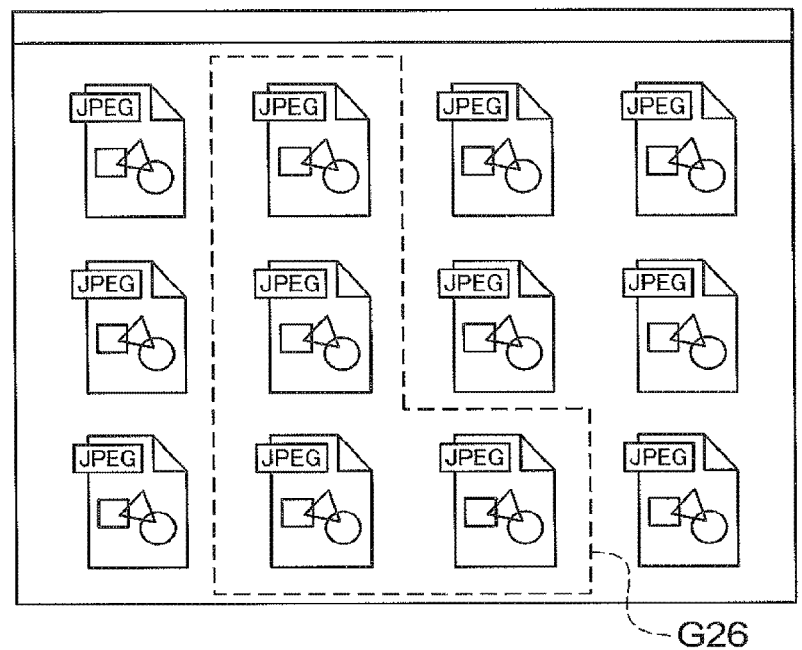
(b)

Fig.22
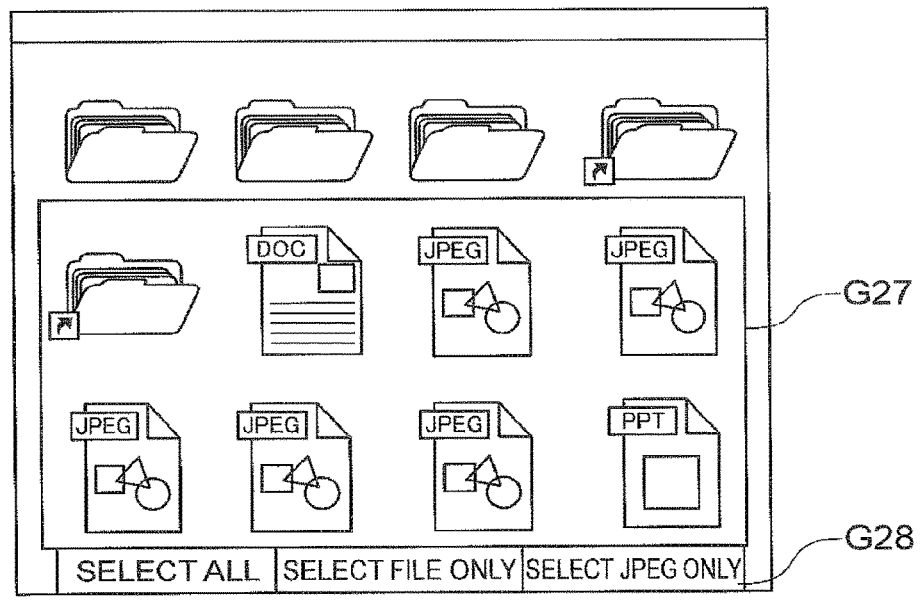
(a)
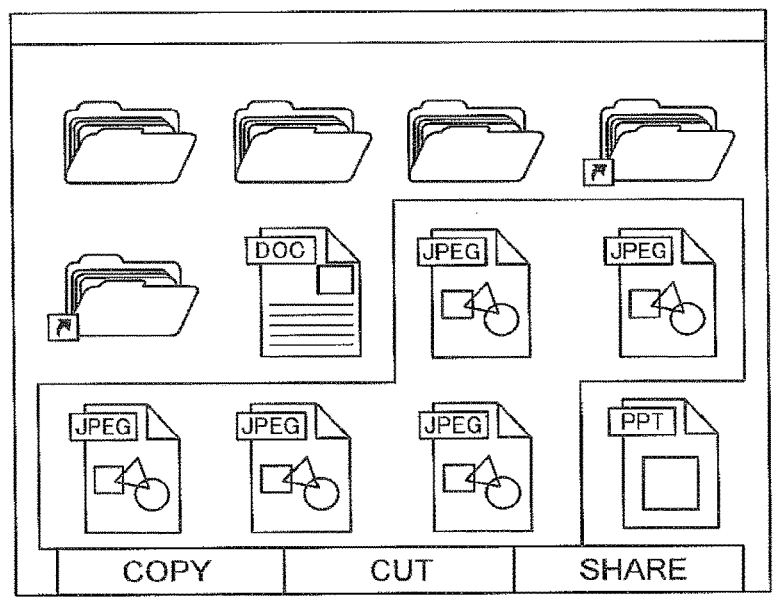
(b)

TERMINAL DEVICE AND METHOD FOR SELECTING OBJECT

TECHNICAL FIELD

The present invention relates to a terminal device and a method for selecting an object.

BACKGROUND ART

In recent years, a terminal device such as a smartphone, a tablet terminal, or a personal computer which includes a touch panel display as an input/output device has been rapidly become popular. The terminal device of this type uses an operating tool such as a finger of a user and a stylus pen to select an object such as a document and an image displayed on the touch panel display.

For example, a document display device described in Patent Literature 1 below has been known as a technique to select a text displayed on the touch panel display. The document display device can select a range of the text displayed on the touch panel display by moving a finger in a desired direction while the finger has contact with the touch panel display.

CITATION LIST

Patent Literature

[Patent Literature 1] JP 2013-8201 A

SUMMARY OF INVENTION

Technical Problem

However, there is a tendency that a selection operation of the above-mentioned conventional document display device becomes complex when a selection range is wide. There is a tendency that it is difficult for the above-mentioned conventional document display device to intuitively select a necessary range. For example, there is a case where an operation time becomes longer according to the size of the selection range. Also, when the operation time is set to be short, it is difficult to accurately define the selection range.

The present invention has been made in consideration of the above problem. A purpose of the present invention is to provide a terminal device and a method for selecting an object which can accurately define a selection range by an intuitive operation when the object on a touch panel display is selected.

Solution to Problem

To solve the above problem, a terminal device according to one embodiment of the present invention includes a touch panel display configured to display an object and sense proximity or contact of an operating tool, a coordinate detecting unit configured to detect a coordinate value which is an approaching position of the operating tool or a contacting position of the operating tool to the touch panel display, and an object selecting unit configured to set a selection range defined by the coordinate values of a plurality of operating tools and select the object included in the selection range when the coordinate values of the plurality of operating tools detected by the coordinate detecting unit have been concurrently maintained for a predetermined time.

A method for selecting an object according to another embodiment of the present invention includes an input/output step in which a touch panel display displays an object and senses proximity or contact of an operating tool, a coordinate detection step in which a coordinate detecting unit detects a coordinate value which is an approaching position of the operating tool or a contacting position of the operating tool to the touch panel display, and an object selection step in which an object selecting unit sets a selection range defined by the coordinate values of a plurality of operating tools and selects the object included in the selection range when the coordinate values of the plurality of operating tools detected by the coordinate detecting unit have been concurrently maintained for a predetermined time.

According to the terminal device or the method for selecting an object, when coordinate values of positions of proximity or contact of a plurality of operating tools on a touch panel display are detected and it has been determined that the coordinate values of the plurality of operating tools have been maintained for a predetermined time in a state where the object is displayed by the touch panel display, an object included in a selection range surrounded by these coordinate values is selected. Accordingly, the object in a desired range is accurately selected by an operation for a certain time. As a result, the object can be selected by accurately defining the selection range through the intuitive operation. In addition, a competition with the traditional input operation by using the plurality of operating tools can be prevented by setting the selection range according to whether the coordinate values of the plurality of operating tools have been maintained for a certain time.

Advantageous Effects of Invention

According to the present invention, a selection range can be accurately defined by an intuitive operation when an object on a touch panel display is selected.

BRIEF DESCRIPTION OF DRAWINGS

FIG. 2 is a diagram of an exemplary structure of data stored in a coordinate information storage unit 31 in FIG. 1.

FIGS. 6(a) and 6(b) are diagrams of exemplary output of the object abbreviation display in the terminal device 1 in FIG. 1.

FIG. 7 is a diagram of an exemplary structure of data stored in a coordinate information storage unit 31 according to a modification of the present invention.

FIGS. 9(a) and 9(b) are diagrams of exemplary screen output at the time of selecting the object according to the modification of the present invention.

FIGS. 16(a) and 16(b) are diagrams of images of the object selected by the removing processing of the selection range of the object according to the modification of the present invention.

FIGS. 17(a) and 17(b) are schematic diagrams of the ranges on the touch panel display 21 added by adding processing of the selection range of the object according to the modification of the present invention.

FIGS. 19(a) and 19(b) are diagrams of images of the object selected in the modification of the present invention.

FIGS. 20(a) and 20(b) are diagrams of images of the object selected in the modification of the present invention.

FIGS. 22(a) and 22(b) are diagrams of images of the object selected in the modification of the present invention.

DESCRIPTION OF EMBODIMENTS

Figure 1:
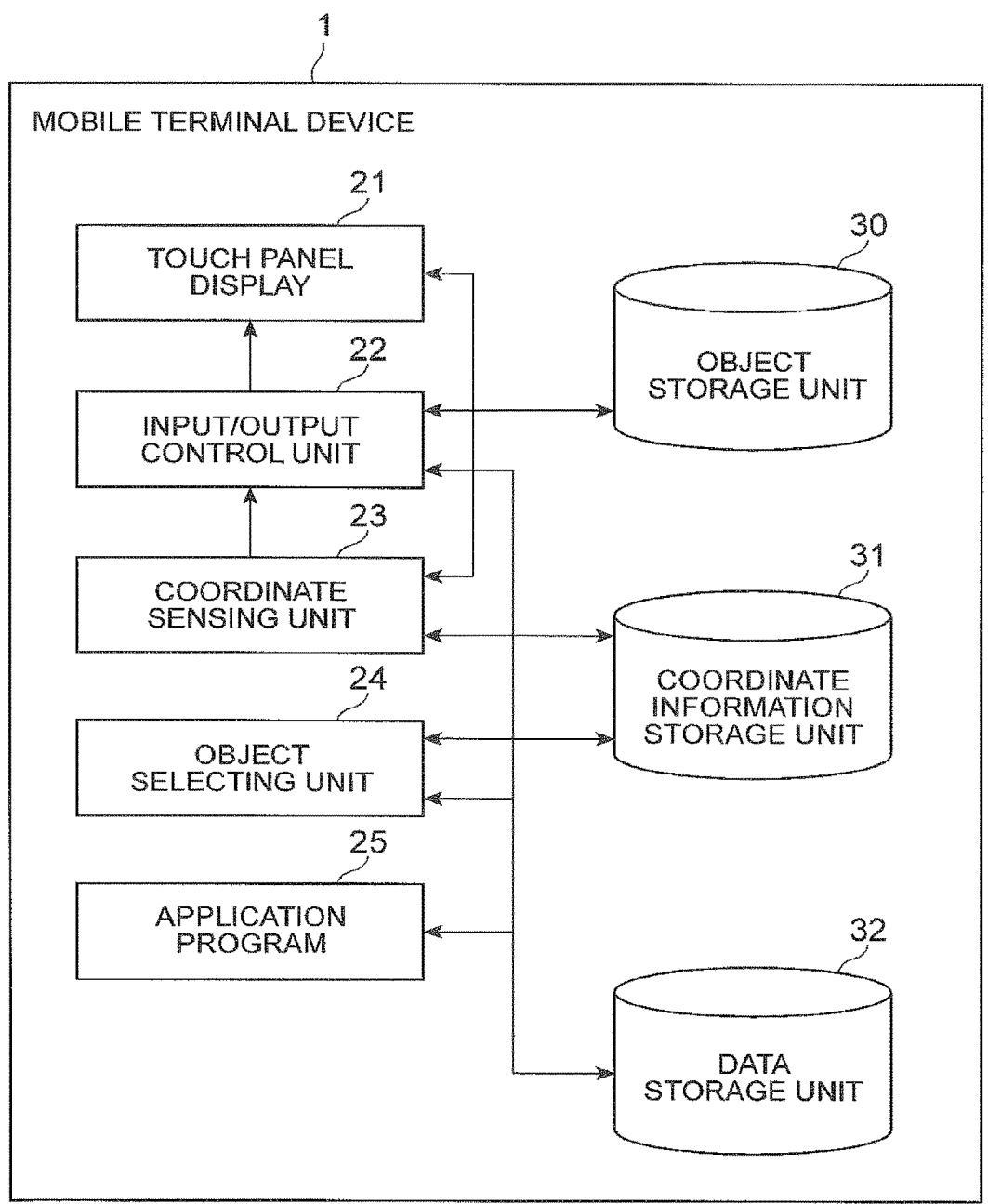
FIG. 1 is a schematic diagram of a terminal device according to a preferred embodiment of the present invention.

A preferred embodiment of a terminal device and a method for selecting an object according to the present invention is described below in detail with reference to the drawings. In the description on the drawings, the same element is denoted with the same reference numeral, and an overlapped description is omitted.

FIG. 1 is a schematic diagram of a terminal device 1 according to a preferred embodiment of the present invention. The terminal device 1 illustrated in FIG. 1 is an information processing terminal device which can be connected to a mobile communication network or a wireless local area network (LAN), such as a smartphone, a tablet terminal, a mobile phone terminal, and a personal computer.

The terminal device 1 includes a so-called touch panel display 21 as an output device for displaying information. The terminal device 1 includes an input/output control unit 22, a coordinate sensing unit (coordinate detecting unit) 23, an object selecting unit 24, an application program 25, an object storage unit 30, a coordinate information storage unit 31, and a data storage unit 32 as functional components. Functions of the respective components of the terminal device 1 are described in detail below.

The touch panel display 21 included in the terminal device 1 displays an object such as an icon, a photograph, and a document as an image. The touch panel display 21 is an input/output device for receiving an input operation of information performed by sensing proximity or contact of an operating tool. In the present embodiment, the touch panel display 21 can concurrently sense the proximity or the contact of a plurality of fingers of a user as the operating tool. However, the touch panel display 21 may also be able to sense proximity or contact of a stylus pen as the operating tool. In addition, the touch panel display 21 can concurrently sense proximity distances between the plurality of fingers of the user and a screen of the touch panel display 21. For example, the touch panel display 21 is an electrostatic capacitance type touch panel display and can calculate a distance (proximity distance) between the screen and the finger by sensing an amount of change of an electrostatic capacity between the finger and a circuit in the touch panel display. Accordingly, the touch panel display 21 can sense the contact of the finger with the screen in distinction from the proximity of the finger to the screen. Also addition, a component, which can calculate the proximity distance optically by using infrared ray, such as an In-Cell type can be employed as the touch panel display 21.

The input/output control unit 22 reads the object from the object storage unit 30 for storing the data of the object to be displayed and transfers it to the touch panel display 21 so as to control the display of the object on the touch panel display 21. In addition, the input/output control unit 22 receives an input of the information of the object by the proximity or the contact of the finger of the user via the coordinate sensing unit 23. For example, the input/output control unit 22 performs the control to display an icon image on the touch panel display 21 and receives the input of a predetermined command corresponding to the icon image by detecting the contact with the icon image. Also, the input/output control unit 22 transfers coordinate information of the proximity or the contact of the finger of the user to the object selecting unit 24. When the object selecting unit 24 has selected a range of the object including a text image or an image, the input/output control unit 22 also performs display control relative to selecting the range (to be described in detail below).

As an object to which the display control is performed by the input/output control unit 22, in addition to a text image such as an electronic book and an electronic mail data, a text image including a photograph image such as a diary data posted to a Web site for social networking service (SNS) on the Internet can be included, but not limited to. Also, these objects may be read from the object storage unit 30 and may be obtained, by the terminal device 1 from outside via the mobile communication network or the wireless LAN.

The coordinate sensing unit 23 receives a signal from the touch panel display 21. Then, the coordinate sensing unit 23 calculates a two-dimensional coordinate value indicating an approaching position or a contacting position of the finger on the screen detected by the touch panel display 21 (referred to as "coordinate information" below) and a distance between the finger detected by the touch panel display 21 at this time and the screen (referred to as "proximity distance" below) each time. The coordinate sensing unit 23 generates detection type information based on the calculated proximity distance, and the detection type information indicates whether the detected coordinate information has been detected relative to the finger which has approached or relative to the finger which has contacted. Here, the coordinate sensing unit 23 may generate information indicating the proximity distance instead of the detection type information. The coordinate sensing unit 23 associates a two-dimensional coordinate value "(X,Y)" as the coordinate information with the detection type information and stores them in the coordinate information storage unit 31. At this time, when the plurality of fingers has concurrently been detected by the touch panel display 21, the coordinate sensing unit 23 concurrently generates a plurality of combinations of the coordinate information and the detection type information and stores them.

An exemplary structure of the data stored in the coordinate information storage unit 31 by the coordinate sensing unit 23 is illustrated in FIG. 2. As illustrated in FIG. 2, when the touch panel display 21 has detected the proximity of two fingers, "detection type "proximity", coordinate value "(X1, Y1)"", and "detection type "proximity", coordinate value "(X2, Y2)"" are stored in the data storage unit 32 as two data records in which the coordinate information and the detection type information are associated with each other.

The description returns to FIG. 1. The object selecting unit 24 sets the selection range relative to the object including the text image and the image displayed on the touch panel display 21 and selects the text data and the image data included in the selection range, and then, stores them in the data storage unit 32. Specifically, the object selecting unit 24 continuously reads the information on the plurality of operating tools, which is sensed by the coordinate sensing unit 23, from the coordinate information storage unit 31. In addition, the object selecting unit 24 determines whether the condition is satisfied in which coordinates indicated by the coordinate information of two selectors included in the read information are concurrently maintained for a previously set time (for example, one second) and the detection type information corresponding to the two selectors indicates "proximity" (referred to as "range selecting condition" below). At this time, when determining whether the coordinate information is maintained, the object selecting unit 24 determines it according to whether the displacement amount of the coordinate value in the set time is within a range of a predetermined error. When the range selecting condition is satisfied, the object selecting unit 24 sets the selection range on the touch panel display 21 defined by the coordinate information of the two operating tools and selects the text data and the image data in the object included in the selection range. After that, the object selecting unit 24 stores the selected data in the data storage unit 32 at the timing of determining the selection of the data in the object according to the reception of the predetermined operation from the user via the input/output control unit 22. Here, the object selecting unit 24 can directly transfer the data determined to be selected to the application program 25 and may set various kinds of types of data transferring operation as "copy", "cut", "search", and "share".

After setting the selection range of the object as described above, the object selecting unit 24 determines the selection of the object as follows. That is, after it has been determined that the range selecting condition has been satisfied, the object selecting unit 24 determines whether a condition is satisfied in which the coordinates of the two operating tools change to be close to each other (so-called pinch-in operation) and the detection type information corresponding to the two selectors is maintained to be "proximity" (referred to as "range selection determining condition"). When it has been determined that the range selection determining condition has been satisfied, the object selecting unit 24 determines the selected data. At this time, the range selection determining condition may be a change of both coordinates of the two selectors and may be a change of the coordinate of one of the two selectors to be close to the other selector.

Also, when setting the selection range of the object, the object selecting unit 24 can control the abbreviation display of the object via the input/output control unit 22 as follows. Particularly, the object selecting unit 24 determines in the state where the coordinate values of the two operating tools are detected whether all the following conditions (referred to as "abbreviation display condition" below) have been satisfied, i.e., that the detection type information of one operating tool is "contact", that the detection type information of the other operating tool is "proximity", that the coordinate value of one operating tool is maintained, and that a position indicated by the coordinate value of the other operating tool changes to be closer to a position indicated by the coordinate value of one operating tool (so-called "pinch-in operation"). When it has been determined that the abbreviation display condition has been satisfied, the object selecting unit 24 controls the input/output control unit 22 to abbreviate the display in a range between the positions indicated by the coordinate values of the two operating tools of the displayed object and display a part of the object on the side of the operating tool where the "proximity" has been sensed so as to fold (move up) it to the abbreviated range.

The application program 25 is various programs for performing processing to the data transferred from the object selecting unit 24. For example, the application program 25 is a document creation program, an electronic mail creation program, a browser to connect to a Web site, and a program for browsing an electronic book. In a case where the data selected by the object selecting unit 24 and the type of the data transferring operation are transferred, the application program 25 performs the processing according to them. For example, when the operation type "copy" is transferred, the application program 25 copies the data to a document data or an electronic mail document. When the operation type "search" is transferred, the application program 25 starts search processing on the Internet by using the data as a search key. When the operation type "share" is transferred, the application program 25 transmits the data to post it to the Web site.

Figure 3:
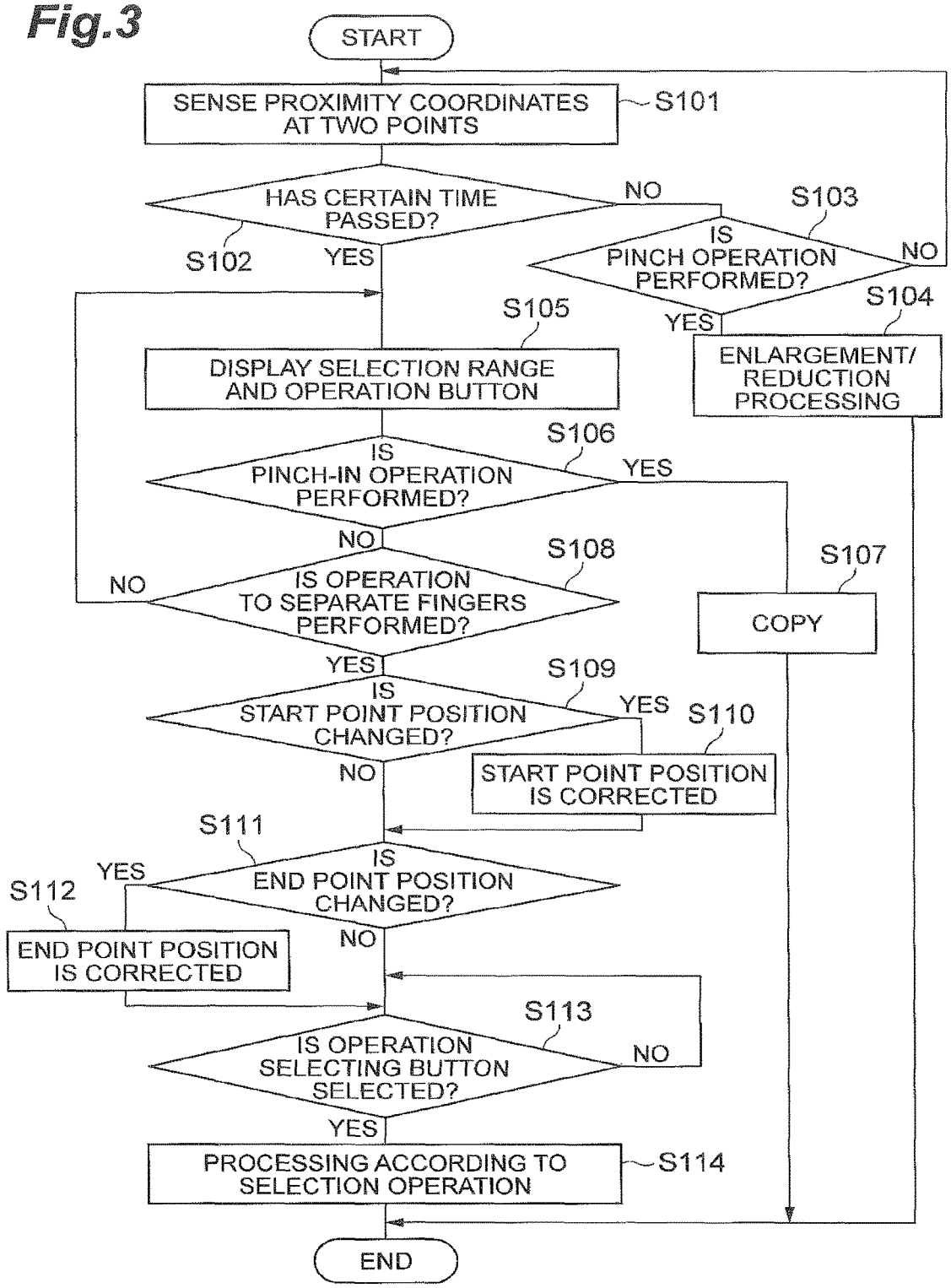
FIG. 3 is a flowchart of an operation at the time of selecting an object by a terminal device 1 in FIG. 1.
Figure 4:
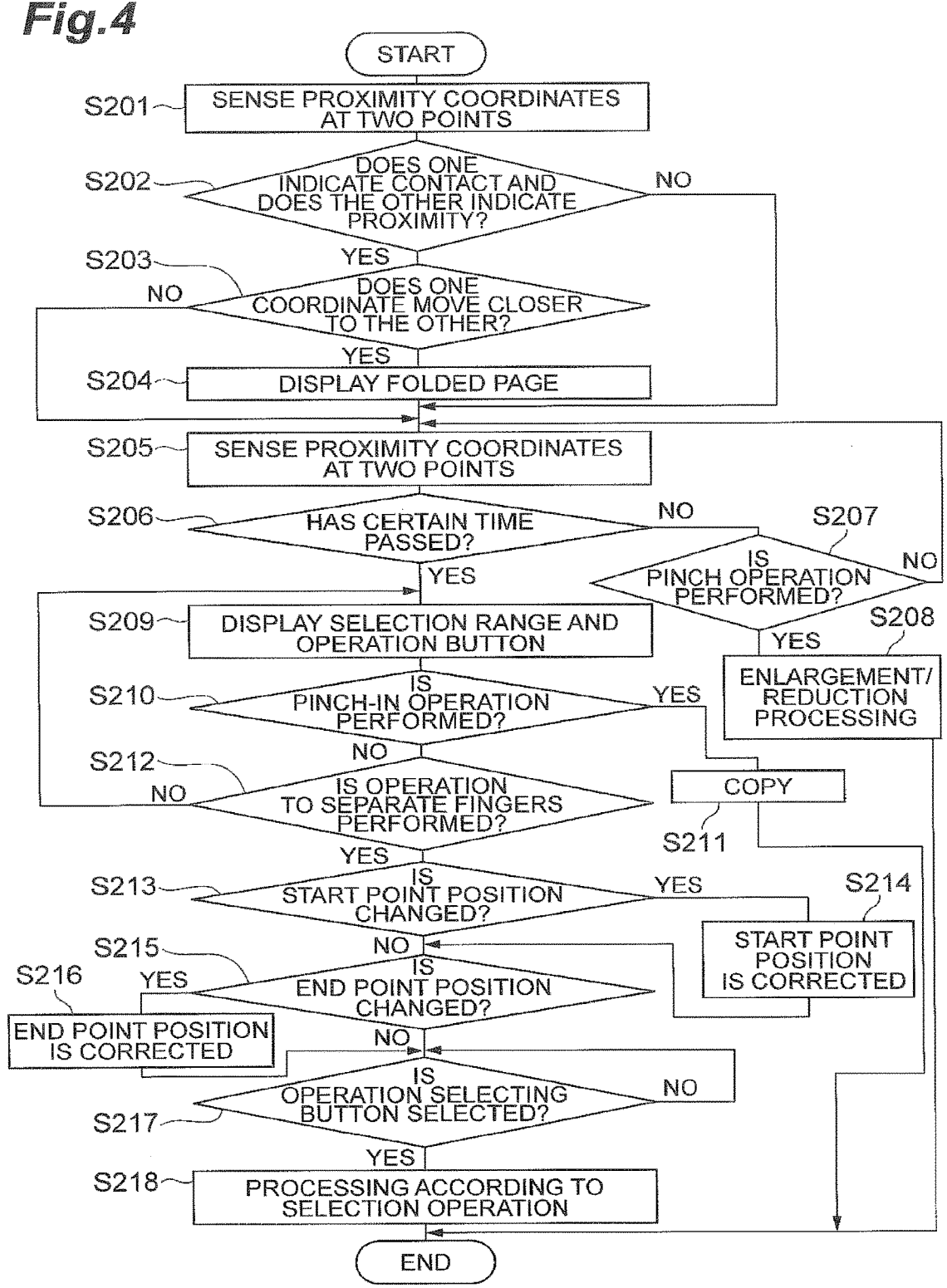
FIG. 4 is a flowchart of an operation of an object abbreviation display and the operation at the time of selecting the object by the terminal device 1 in FIG. 1.
Figure 5:
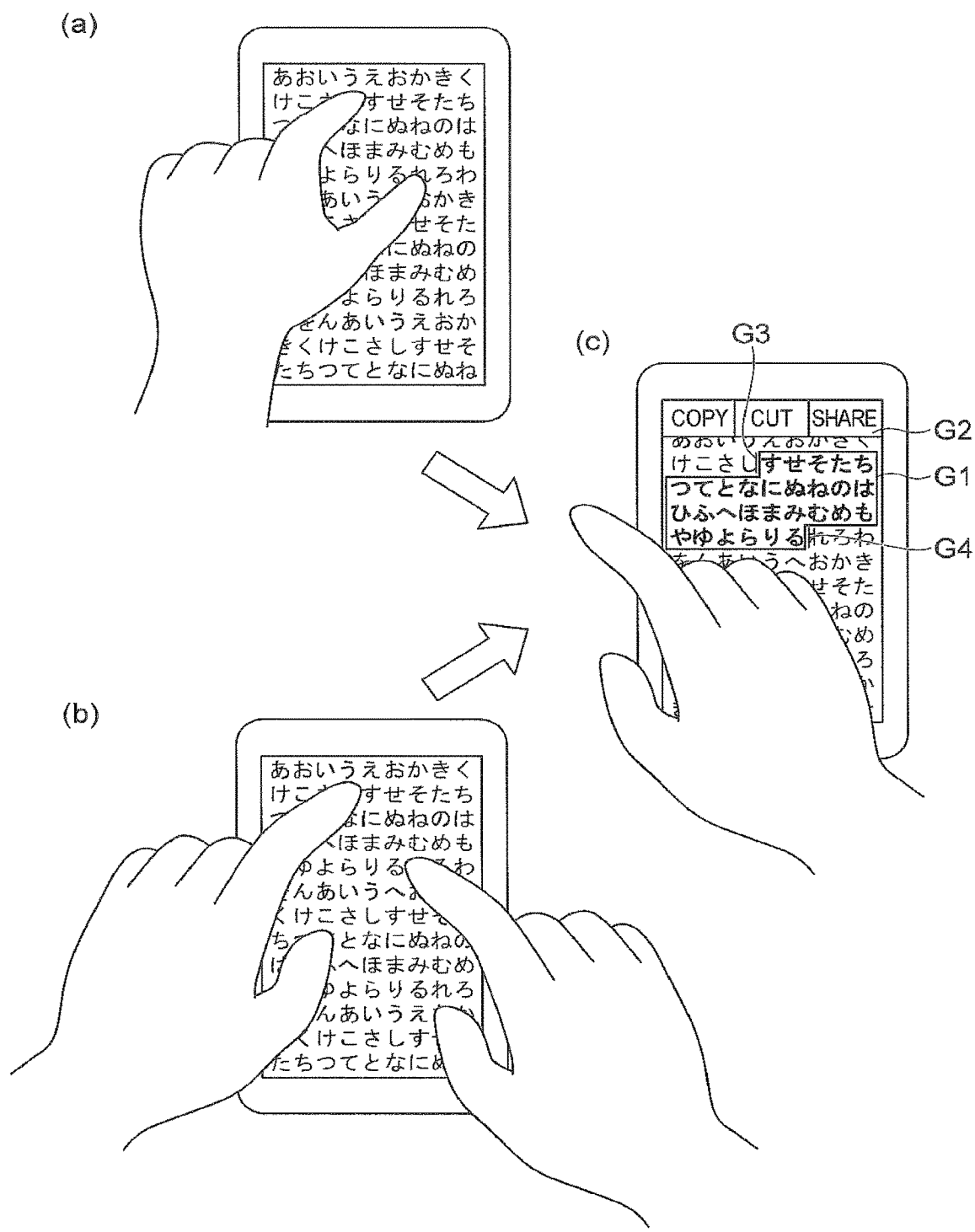
FIGS. 5(a) to 5(c) are diagrams of exemplary output at the time of selecting the object in the terminal device 1 in FIG. 1.

The operation of the terminal device 1 is described with reference to FIGS. 3 and 4 below. At the same time, the method for selecting the object by the terminal device 1 is described in detail below. FIG. 3 is a flowchart of the operation at the time of selecting the object by the terminal device 1. FIG. 4 is a flowchart of the operation of the object abbreviation display and the operation at the time of selecting the object by the terminal device 1. Also, exemplary output of the touch panel display 21 at the time of selecting the object is illustrated in FIGS. 5(*a*) to 5(*c*). Exemplary output of the object abbreviation display on the touch panel display 21 is illustrated in FIGS. 6(*a*) and 6(*b*).

First, the proximity of the fingers of the user is sensed at two points by the coordinate sensing unit 23 in a state where the object is displayed on the touch panel display 21 by referring to FIG. 3 (step S101, FIGS. 5(*a*) and 5(*b*)). After that, the object selecting unit 24 determines whether the range selecting condition has been satisfied (step S102). As a result of the determination, when it has been determined that the range selecting condition has not been satisfied (step S102; NO), it is determined whether or not two points of the contact of the fingers of the user are sensed by the input/output control unit 22 and the two coordinates move closer to each other or separate from each other (whether or not so-called pinch-in/pinch-out operation is performed) (S103). When it has been determined that the pinch operation has been performed (step S103; YES), the input/output control unit 22 performs enlargement/reduction processing to the displayed object (step S104). Whereas, when it has been determined that the pinch operation has not been performed (step S103; NO), the procedure returns to step S101, that is, the procedure returns to the processing for selecting the range of the object again.

On the other hand, when it has been determined that the range selecting condition has been satisfied (step S102; YES), the object selecting unit 24 displays range G1 of the selected object on the touch panel display 21 by highlighting (emphasis) it and/or displaying it as surrounding by a frame. At the same time, a button image G2 is displayed on the touch panel display 21 (step S105 and FIG. 5(c)). The button image G2 is used to make the user select an operation condition of the data transfer. At this time, the object selecting unit 24 performs the control so that cursors G3 and G4 are overlapped and displayed on a start point position and an end point position of the selected range, respectively. Next, the object selecting unit 24 determines whether the range selection determining condition has been satisfied (step S106). As a result of the determination, when it has been determined that the range selection determining condition has been satisfied (step S106; YES), the object selecting unit 24 determines the selected data. The operation type is selected as "copy", and the data is stored in the data storage unit 32 (step S107).

On the other hand, when it has been determined that the range selection determining condition has not been satisfied (step S106; NO), the object selecting unit 24 determines whether the proximity or the contact of the two fingers has been no more detected (whether an operation to separate the fingers has been detected) (step S108). When the two fingers have been continuously detected (step S108; NO), the procedure returns to step S105, and the display of the selection range of the object is continued. On the other hand, when the operation to separate the fingers has been detected (step S108; YES), the object selecting unit 24 determines whether processing for changing the start point position has been received by detecting a contact operation (slide operation) by the user relative to the cursor G3 (step S109). When the start point position changing processing has been received (step S109; YES), the object selecting unit 24 changes the start point position of the selection range of the object (step S110). When the start point position changing processing has not been received (step S109; NO), the object selecting unit 24 maintains the start point position of the selection range of the object without changing it. Similarly, the object selecting unit 24 determines whether processing for changing the end point position has been received by detecting the contact operation (slide operation) by the user relative to the cursor G4 (step S111). When the end point position changing processing has been received (step S111; YES), the object selecting unit 24 changes the end point position of the selection range of the object (step S112). When the end point position changing processing has not been received (step S111; NO), the object selecting unit 24 maintains the end point position of the selection range of the object without changing it.

In addition, in a state where the selection range of the object is displayed, the object selecting unit 24 determines whether the operation type of the data transfer has been selected by sensing the contact of the user to the button image G2 (step S113). When the selection of the operation type has been received (step S113; YES), the operation type information and the data of the object in the selection range are transferred from the object selecting unit 24 to the application program 25 (step S114). As a result, processing according to the operation type for using the transferred data is started by the application program 25.

Next, the operation of the terminal device 1 in a case where the object abbreviation display is performed at the time of setting the object selection range is described with reference to FIG. 4.

First, in a state where the object is displayed on the touch panel display 21, the coordinate sensing unit 23 senses the proximity of the fingers of the user at two points (step S201). After that, the object selecting unit 24 determines whether the abbreviation display condition is satisfied (steps S202 and S203). As a result of the determination, when it has been determined that the abbreviation display condition has been satisfied (step S202; YES and step S203; YES), the object selecting unit 24 displays the range G5 of the object between the positions of the two fingers so as to fold it, and at the same time, displays the range G6 which is a part of the object on the side of the finger where "proximity" is detected by folding it to the side of the range G5 (step S204 and FIG. 6(a)). In this state, the selection range of the object is set and determined by performing the operations similarly to those in steps S101 to S114 in FIG. 3 (steps S205 to S218, FIG. 6(b)).

When the abbreviation display of the object is performed, in a case where the move-up operation of the object is not sufficiently performed in one operation, the object selecting unit 24 may repeat the move-up display operation of the object by repeatedly determining the abbreviation display condition. At this time, the move-up display operation is repeated when one finger of the user, of which "proximity" has been sensed, is no more sensed on the touch panel display 21 once.

According to the terminal device 1 described above, in a state where the object is displayed on the touch panel display 21, when it has been determined that the positions of the proximity of the plurality of fingers on the touch panel display 21 have been detected as the coordinate values and the coordinate values of the plurality of fingers have been maintained for a predetermined time, the object included in the selection range surrounded by the coordinate values is selected. Accordingly, the operation time is not affected by the size of the selection range, and a problem does not occur in that it is difficult to set the selection range when the operation time is set to be short. The object in the desired range is accurately selected by the operation performed for a certain time. As a result, the object can be selected by accurately defining the selection range through the intuitive operation. In addition, a competition with the traditional input operation for using the plurality of fingers can be prevented by setting the selection range according to whether the coordinate values of the plurality of fingers have been maintained for a certain time, Specifically, since the selection range is set when "proximity" coordinates of two fingers are maintained for a certain time, the operation can be clearly distinguished from the conventional pinch-in/pinch-out operation performed by the two fingers. Therefore, malfunction can be prevented. In addition, since the object is hardly hidden by the selection operation, the user can set the selection range while confirming it with eyes. Accordingly, the operability is more improved.

Also, since the object selecting unit 24 determines the selected data when the pinch-in operation has been detected as the range selection determining condition, the object selecting unit 24 can determine the selection range of the object selected by a smooth operation continued from the object range selecting operation.

Also, since the object selecting unit 24 can perform the abbreviation display of the object, the selection range can be easily set by using the plurality of fingers when a wider range of the object is selected. Also, the operation of the abbreviation display can be realized by the intuitive operation.

The present invention is not limited to the above-mentioned embodiments. For example, the object selecting unit 24 may determine the range selecting condition, the range selection determining condition, and the abbreviation display condition by using the result of detecting four fingers of the user.

That is, the object selecting unit 24 reads detection information regarding the four fingers from the data stored in the coordinate information storage unit 31 illustrated in FIG. 7. The detection information regarding the four fingers includes "detection type "proximity" and coordinate value "(X1, Y1)"", "detection type "proximity" and coordinate value "(X2, Y2)"", "detection type "proximity" and coordinate value "(X3, Y3)"", and "detection type "proximity" and coordinate value "(X4, Y4)"", respectively. The object selecting unit 24 determines whether the range selecting condition has been satisfied. The range selecting condition includes a condition in which the coordinates indicated by the coordinate information of four selectors included in the read information are concurrently maintained for a predetermined time and a condition in which the detection type information corresponding to the four selectors indicates "proximity". Also, the object selecting unit 24 determines whether the pinch-in operation by using two fingers of both hands has been performed as the range selection determining condition. Specifically, it is determined whether coordinates of one pair of fingers of the four fingers are changed to be closer to each other and coordinates of the other pair of fingers are changed to be closer to each other (so-called pinch-in operation by using both hands) and the detection type information corresponding to the four fingers is maintained to be "proximity". In addition, when determining the abbreviation display condition, the object selecting unit 24 performs the abbreviation display of the object in a case where the abbreviation display condition is satisfied for the respective pairs of the fingers.

Figure 8:
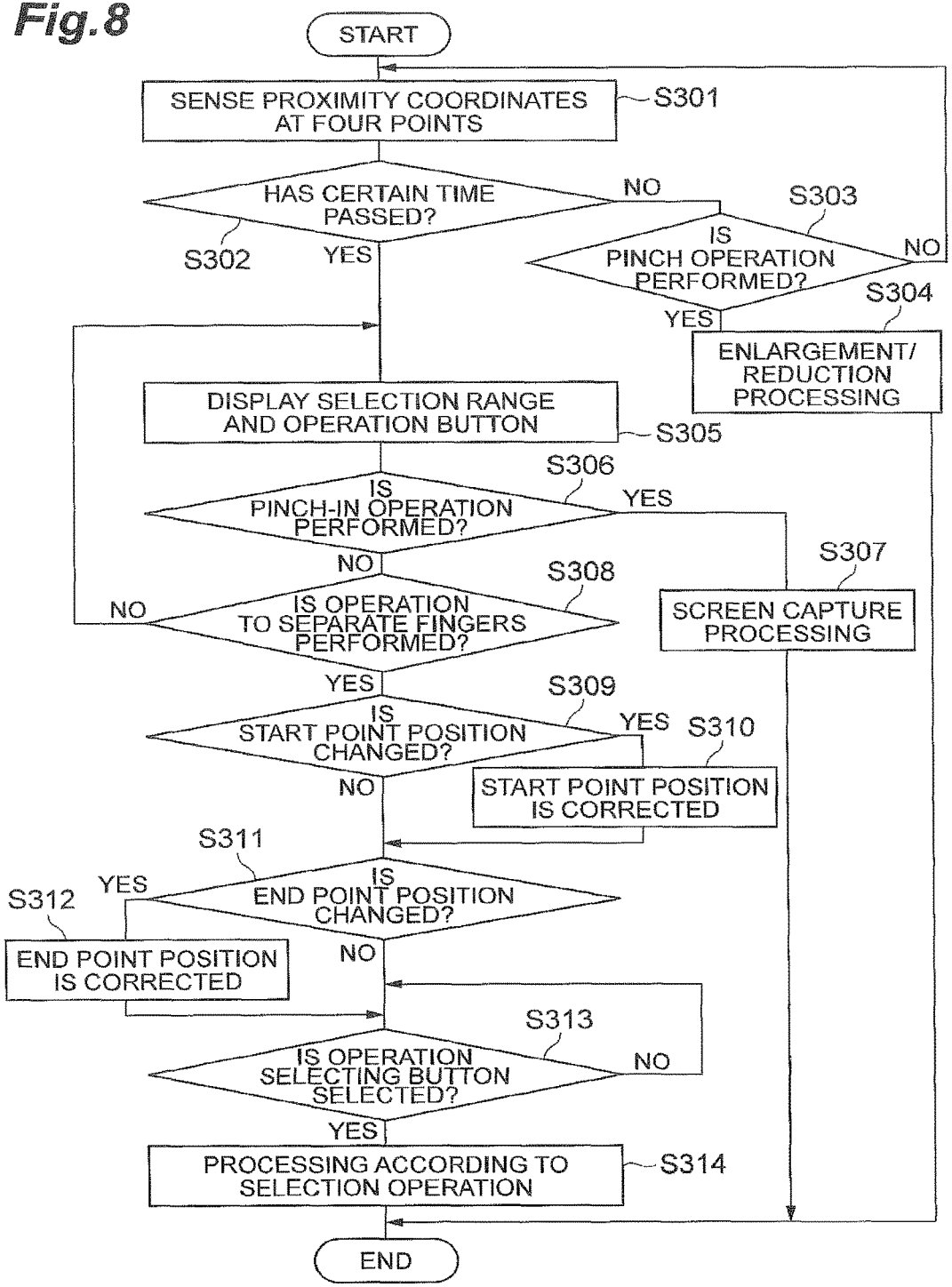
FIG. 8 is a flowchart of an operation at the time of selecting an object according to the modification of the present invention.

FIG. 8 is a flowchart of an operation at the time of selecting the object by using the detection result of the four fingers by the terminal device 1. FIGS. 9(*a*) and 9(*b*) are diagrams of exemplary output of the touch panel display 21 at the time of selecting the object.

First, in a state where the object is displayed on the touch panel display 21, the coordinate sensing unit 23 senses the proximity of the fingers of the user at four points (step S301 and FIG. 9(*a*)). After that, the object selecting unit 24 determines whether the range selecting condition has been satisfied (step S302). As a result of the determination, when it has been determined that the range selecting condition has not been satisfied (step S302; NO), it is determined whether or not two points of the contact of the fingers of the user are sensed by the input/output control unit 22, and whether or not the two coordinates move closer to each other or separate from each other (whether so-called pinch-in/pinch-out operation is performed) (S303). When it has been determined that the pinch operation has been performed (step S303; YES), the input/output control unit 22 performs the enlargement/reduction processing to the displayed object (step S304). Whereas, when it has been determined that the pinch operation has not been performed (step S303; NO), the procedure returns to step S301, that is, the procedure returns to the processing for selecting the range of the object again.

On the other hand, when it has been determined that the range selecting condition has been satisfied (step S302; YES), the object selecting unit 24 displays a range G7 of the selected object on the touch panel display 21 by highlighting (emphasis) it and/or displaying it as surrounding by a frame. At the same time, button images G8 and G9 are displayed on the touch panel display 21 (step S305 and FIG. 9(*b*)). The button images G8 and G9 are used to make the user select an operation condition of the data transfer. Next, the object selecting unit 24 determines whether the range selection determining condition has been satisfied (step S306), As a result of the determination, when it has been determined that the range selection determining condition has been satisfied (step S306; YES), the object selecting unit 24 determines the selected data. The operation type is selected as "capture", and a frame image data including an image and a text included in the selection range is stored in the data storage unit 32 (step S307).

On the other hand, when it has been determined that the range selection determining condition has not been satisfied (step S306; NO), the object selecting unit 24 determines whether the proximity or the contact of the four fingers has been no more detected (whether an operation to separate the fingers has been detected) (step S308). When the four fingers have been continuously detected (step S308; NO), the procedure returns to step S305, and the display of the selection range of the object is continued. On the other hand, when the operation to separate the fingers has been detected (step S308; YES), the object selecting unit 24 determines whether processing for changing the start point position has been received by detecting a contact operation (slide operation) by the user relative to the selection range G7 (step S309). When the start point position changing processing has been received (step S309; YES), the object selecting unit 24 changes the start point position of the selection range of the object (step S310). When the start point position changing processing has not been received (step S309; NO), the object selecting unit 24 maintains the start point position of the selection range of the object without changing it. Similarly, the object selecting unit 24 determines whether processing for changing the end point position has been received by detecting the contact operation (slide operation) by the user relative to the selection range G7 (step S311). When the end point position changing processing has been received (step S311; YES), the object selecting unit 24 changes the end point position of the selection range of the object (step S312). When the end point position changing processing has not been received (step S311; NO), the object selecting unit 24 maintains the end point position of the selection range of the object without changing it. Here, the start point position and the end point position of the selection range are changed by detecting the contact operations relative to upper left, upper right, lower right, lower left, an upper side, a right side, a lower side, or a left side of the frame of the selection range G7.

In addition, in a state where the selection range of the object is displayed, the object selecting unit 24 determines whether the operation type of the data transfer has been selected by sensing the contact of the user to the button images G8 and 09 (step S313). When the selection of the operation type has been received (step S313; YES), the operation type information and the data of the object in the selection range are transferred from the object selecting unit 24 to the application program 25 (step S314). As a result, processing according to the operation type for using the transferred data is started by the application program 25.

Also, in the above-mentioned embodiment, the determination on the object range selecting condition is started when two or four operating tools are concurrently detected on the touch panel display. However, the determination on the object range selecting condition may be started when the coordinates of the two points are detected at different time from each other or the coordinates of the four points are detected at different time from each other.

Also, in the above-mentioned embodiment, the object selecting unit 24 determines whether the proximity at the two points or the four points has been sensed as the range selecting condition and the range selection determining condition. However, even when the contact at the two points or the four points has been sensed, it may be determined that the range selecting condition and the range selection determining condition have been satisfied. Also, the operation type of the data transfer which is selected when the range selection determining condition has been satisfied is not limited to "copy" and "capture". The operation type of the data transfer may be various operation types such as "cut" and "paste to mail text".

(Modification of Object to be Selected)

Figure 10:
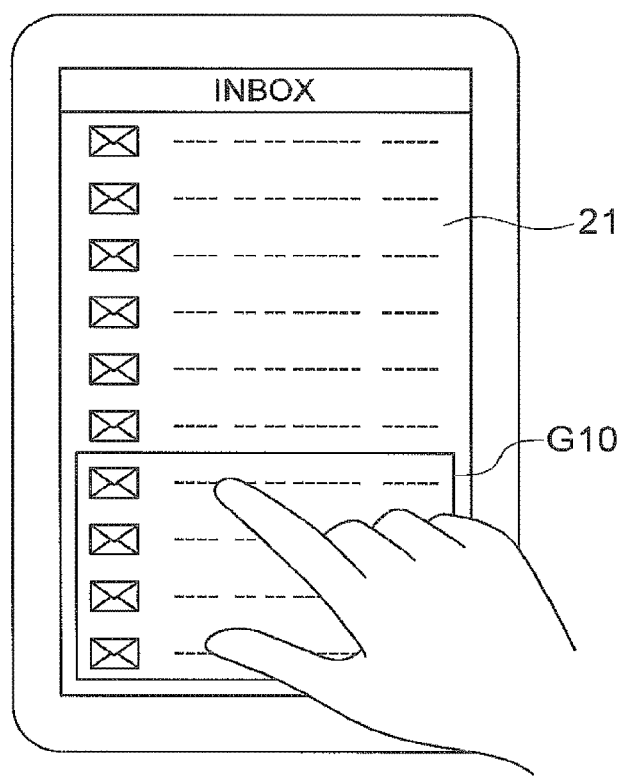
FIG. 10 is a diagram of an exemplary screen output at the time of selecting the object according to the modification of the present invention.

Also, in the above-mentioned embodiment, the text image is described as the object to be selected. However, the object to be selected may be various objects other than the text image. For example, as illustrated in FIG. 10, in a state where a received mail list screen is displayed on the touch panel display 21 by an application for an electronic mail, the object selecting unit 24 of the terminal device 1 operates to select a received mail displayed in a selection range G10 when the range selecting condition has been satisfied. As the selection range G10, a rectangular region is set which has two sides in one direction (along a short side direction of the touch panel display 21) while having the coordinates of the two operating tools as a reference. At this time, the object selecting unit 24 sets a type of a received mail transferring operation as "delete", "move to another folder", and the like, and the data to be transferred is the text including a header of the electronic mail and the like.

Figure 11:
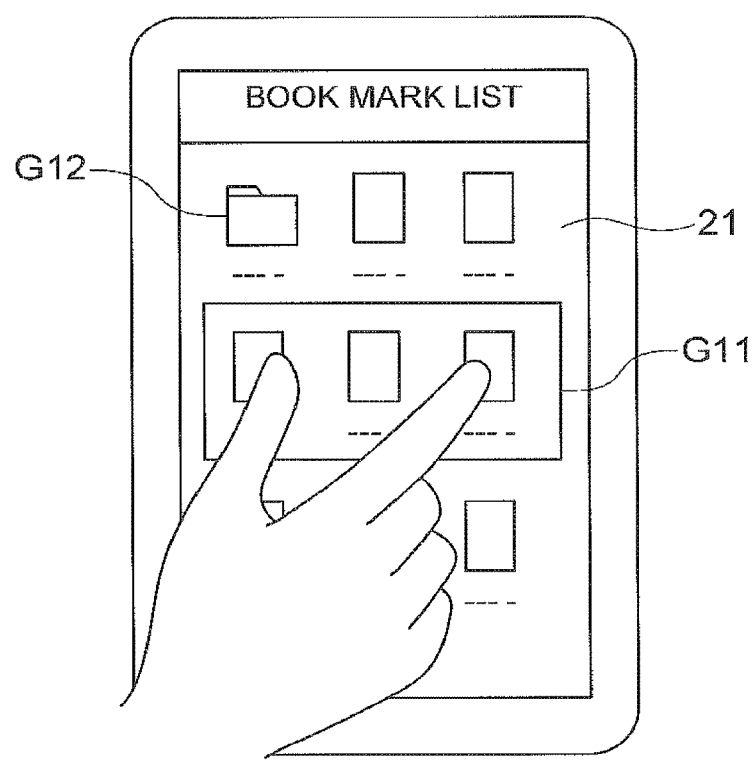
FIG. 11 is a diagram of an exemplary screen output at the time of selecting the object according to the modification of the present invention.

Also, as illustrated in FIG. 11, when the range selecting condition has been satisfied in a state where a bookmark list screen has been displayed on the touch panel display 21 by a Web browser application and the like, the object selecting unit 24 operates to select a bookmark displayed in a selection range G11. The selection range G11 is set as a rectangular region having the coordinates of the two operating tools therein. At this time, as the data to be transferred, the object selecting unit 24 employs the data including the text data and the image data which is downloaded according to the selected bookmark or address information of a download location such as a uniform resource locator (URL) according to the selected bookmark. Also, when the selected object includes a folder G12 in which a plurality of bookmarks is stored, the object selecting unit 24 employs all the bookmarks included in the folder G12 as a selection target.

Figure 12:
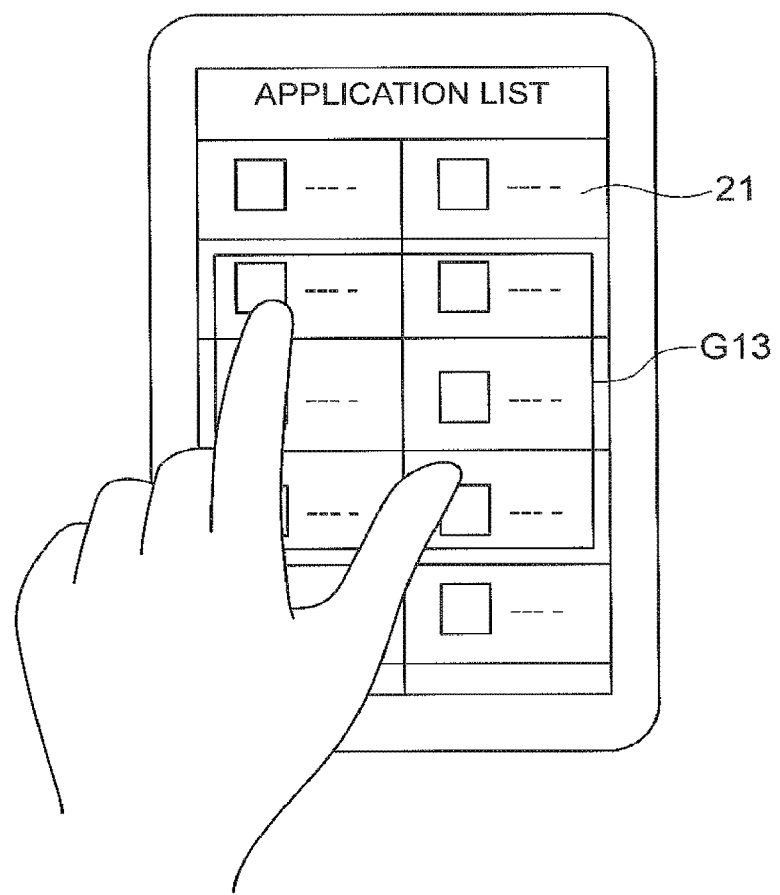
FIG. 12 is a diagram of an exemplary screen output at the time of selecting the object according to the modification of the present invention.

Also, as illustrated in FIG. 12, when the range selecting condition has been satisfied in a state where an application list screen has been displayed on the touch panel display 21 by an operating system and the like, the object selecting unit 24 operates to select the application program displayed in a selection range G13. The selection range G13 is set as a rectangular region having the coordinates of the two operating tools in the four corners. At this time, the object selecting unit 24 sets the type of an application program transferring operation as "install", "uninstall", "share", "copy", and the like. As the data to be transferred the object selecting unit 24 employs the storage location information of an execution program corresponding to the selected application program (shortcut), a text data including an image data relating to the execution program, or address information such as an address for install and an address for uninstall corresponding to the selected application program. Also, when the selected object includes a folder in which a plurality of application programs is stored, the object selecting unit 24 employs all the application programs included in the folder as the selection target.

Figure 13:
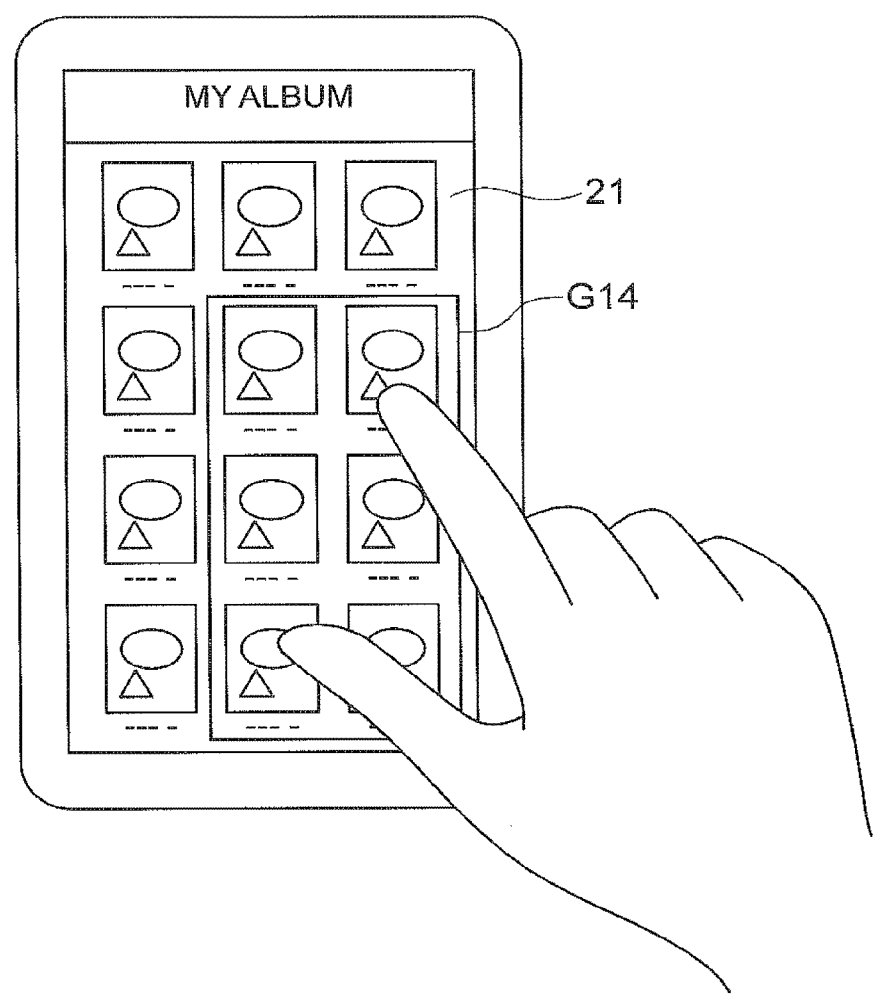
FIG. 13 is a diagram of an exemplary screen output at the time of selecting the object according to the modification of the present invention.

Also, as illustrated in FIG. 13, when the range selecting condition has been satisfied in a state where a photograph list screen has been displayed on the touch panel display 21 by an application program for editing a photograph and the like, the object selecting unit 24 operates to select an image data displayed in a selection range G14. The selection range G14 is set as a rectangular region having the coordinates of the two operating tools in the four corners. At this time, when the selected object includes a folder in which a plurality of image data is stored, the object selecting unit 24 employs all the image data included in the folder as a selection target.

Figure 14:
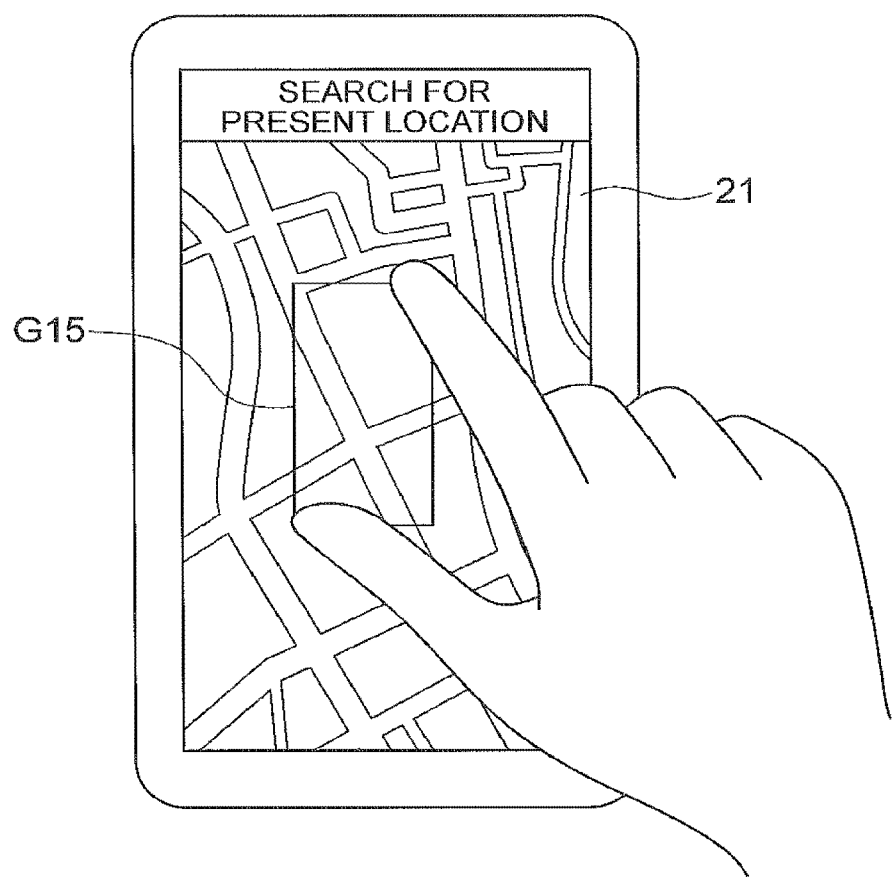
FIG. 14 is a diagram of an exemplary screen output at the time of selecting the object according to the modification of the present invention.

In addition, as illustrated in FIG. 14, when the range selecting condition has been satisfied in a state where a map image is displayed on the touch panel display 21 by an application program for map retrieval and the like, the object selecting unit 24 operates to select the map image displayed in a selection range G15. The selection range G15 is set as a rectangular region having the coordinates of the two operating tools in the four corners. At this time, the object selecting unit 24 can make the data to be transferred include address information such as an URL corresponding to a position indicated by the map image in addition to an image data corresponding to the selected map image.

(Modification for Removing Selection Range)

Figure 15:
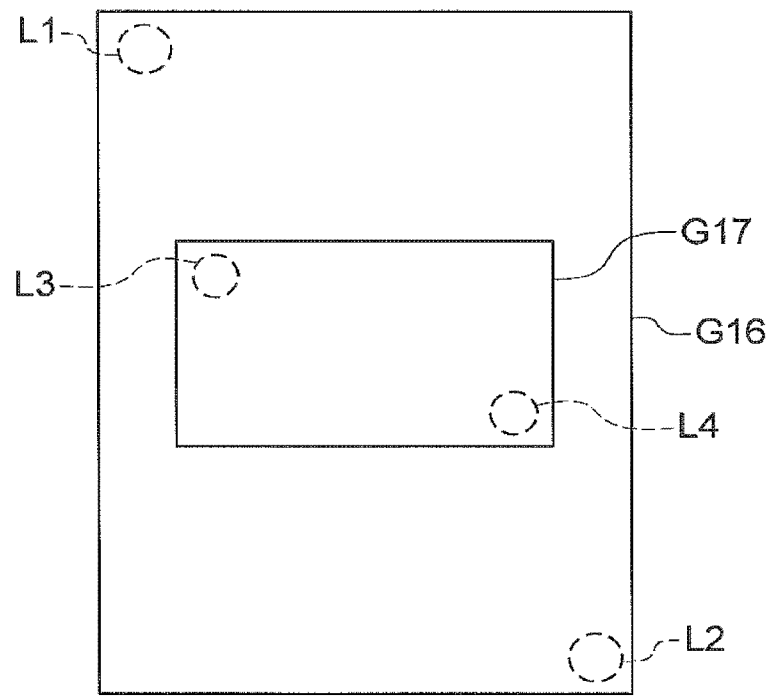
FIG. 15 is a schematic diagram of a range on a touch panel display 21 removed by removing processing of a selection range of the object according to the modification of the present invention.

The object selecting unit 24 of the terminal device 1 according to the above-mentioned embodiment may operate to remove a partial range from the selection after setting the selection range once. FIG. 15 is a schematic diagram of a range on the touch panel display 21 removed by removing processing of the selection range by the object selecting unit 24. FIGS. 16(*a*) and 16(*b*) are diagrams of images of the object selected by the removing processing of the selection range by the object selecting unit 24.

As illustrated in FIG. 15, the object selecting unit 24 has set a selection range G16 based on positions L1 and L2 indicated by the coordinate information of two selectors when the range selecting condition has been satisfied. After that and before the selection of the object has been determined, the object selecting unit 24 determines whether the range selecting condition regarding the coordinate information on the other two selectors has been satisfied. When the range selecting condition has been satisfied, the object selecting unit 24 sets a selection range G17 defined by positions L3 and L4 indicated by the coordinate information on the other two selectors. In addition, the object selecting unit 24 recognizes whether the selection range G16, which has been set first, includes the selection range G17 which has been set next. When recognizing that the selection range G16 includes the selection range G17, the object selecting unit 24 removes the selection range G17 from the selection range G16 to select the object. As a result, by a simple operation by using four operating tools of the user (FIG. 16(*a*)), data of regions G18 separated into two parts can be selected from the object such as the text data displayed on the touch panel display 21 (FIG. 16(*b*)). Accordingly, the operation in a case where a part of the object which has been selected once is removed can be more efficiently performed.

(Modification for Adding Selection Range)

Figure 18:
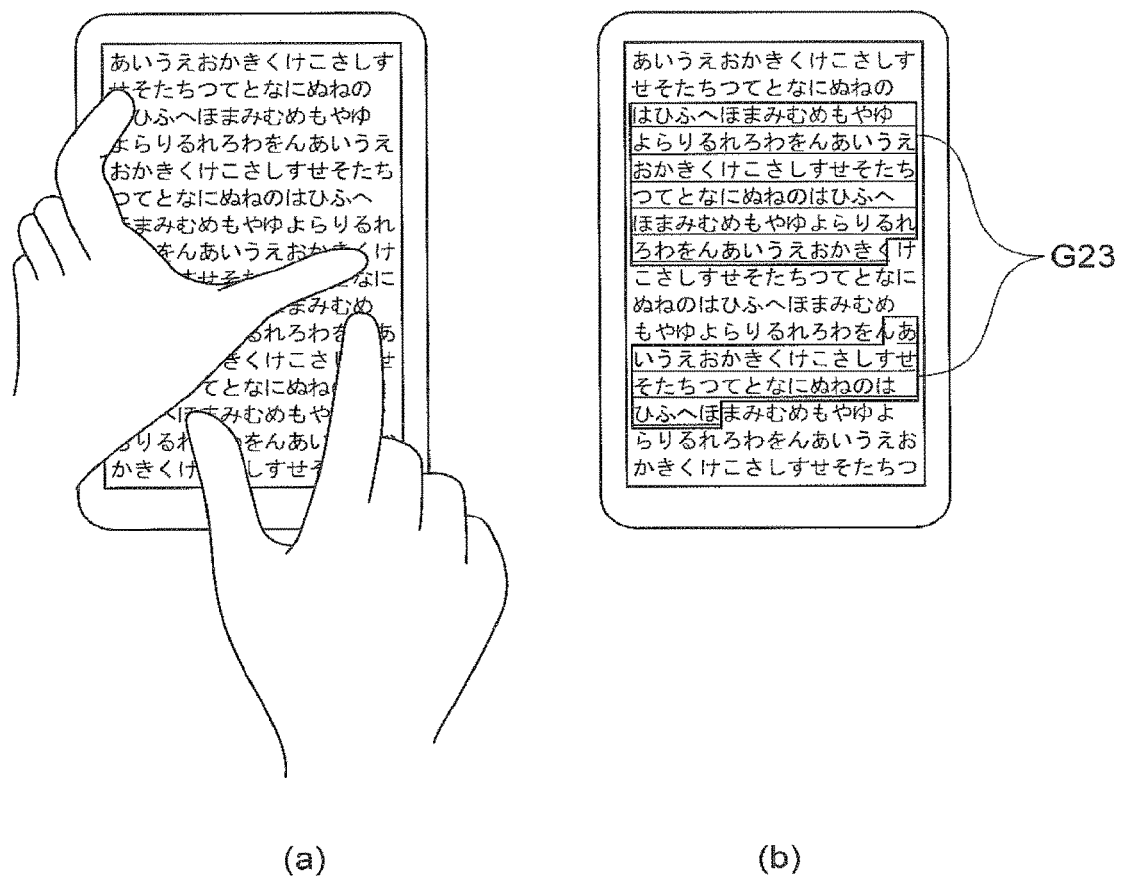
FIGS. 18(a) and 18(b) are diagrams of images of the object selected by the adding processing of the selection range of the object according to the modification of the present invention.

The object selecting unit 24 of the terminal device 1 according to the above-mentioned embodiment may operate to add a partial range after setting the selection range once. FIGS. 17(*a*) and 17(*b*) are schematic diagrams of ranges on the touch panel display 21 which is added by adding operation of the selection range by the object selecting unit 24. FIGS. 18(*a*) and 18(*b*) are diagrams of images of the object selected by the adding processing of the selection range by the object selecting unit 24.

As illustrated in FIG. 17(*a*), the object selecting unit 24 has set a selection range G19 based on positions L5 and L6 indicated by the coordinate information of the two selectors when the range selecting condition has been satisfied. After that and before the selection of the object has been determined, the object selecting unit 24 determines whether the range selecting condition regarding the coordinate information on the other two selectors has been satisfied. When the range selecting condition has been satisfied, the object selecting unit 24 sets a selection range G20 defined by positions L7 and L8 indicated by the coordinate information on the other two selectors. In addition, the object selecting unit 24 recognizes whether the selection range G20 which has been subsequently set exists outside the selection range G19 which has been set first. When recognizing that the selection range G20 exists outside the selection range G19, the object selecting unit 24 adds the selection range G20 relative to the selection range G19 to select the object.

Also, as illustrated in FIG. 17(*b*), the object selecting unit 24 recognizes whether a part of the selection range G22 which has been subsequently set is overlapped with the selection range G21 which has been set first. When recognizing that a part of the selection range G22 is overlapped with the selection range G21, the object selecting unit 24 adds the selection range G22, which is outside the selection range G21 and is not overlapped with the selection range G21, relative to the selection range G21 to select the object.

As a result of the above-mentioned processing, by a simple operation by using the four operating tools of the user (FIG. 18(*a*)), data of regions G23 separated into two parts can be selected from the object such as the text data displayed on the touch panel display 21 (FIG. 18(*b*)). Accordingly, the operation at the time of adding the selection of the object can be more efficiently performed.

(Control of Setting Method for Selection Range According to Object Type)

The object selecting unit 24 of the terminal device 1 according to the above-mentioned embodiment may recognize the type of the object to be selected and operate to change a setting method for a selection range relative to the coordinate information of the selector according to the type. For example, as illustrated in FIG. 19(*a*), when recognizing a text data, which is horizontally written, displayed on the touch panel display 21, the object selecting unit 24 sets an octagonal selection range G24 including a text described between two texts T1 and T2 corresponding to the coordinate information on the two operating tools as a range of a boundary of the selection range. Similarly, as illustrated in FIG. 19(*b*), when recognizing a text data, which is vertically written, displayed on the touch panel display 21, the object selecting unit 24 sets an octagonal selection range G25 including a text described between two texts T3 and T4 corresponding to the coordinate information on the two operating tools as a range of a boundary of the selection range. Accordingly, since the selection range according to the type of the object can be appropriately set, the operation at the time of selecting the object can be more efficiently performed.

Also, as illustrated in FIG. 20(*a*), when recognizing list information such as a photograph data list or an application list displayed on the touch panel display 21, the object selecting unit 24 may set a hexagonal selection range G26 corresponding to the coordinate information of the two operating tools as a range of a boundary of the selection range as illustrated in FIG. 20(*b*). That is, the object selecting unit 24 can change the setting method for the selection range according to a display direction of the object and a display region of each object.

(Control of Automatic Selection of Object)

The object selecting unit 24 of the terminal device 1 according to the above-mentioned embodiment may recognize the type of the object to be selected and operate to automatically select a specific type of an object from among the objects included in the selection range according to a predetermined determination rule. For example, the object selecting unit 24 determines whether the type of the object included in the selection range is "file" or "folder" and operates to automatically select the object of which the type is "file". Also, the object selecting unit 24 recognizes a type which is the largest number of types of the objects included in the selection range and operates to automatically select the object of which type is the largest number of types.

Figure 21:
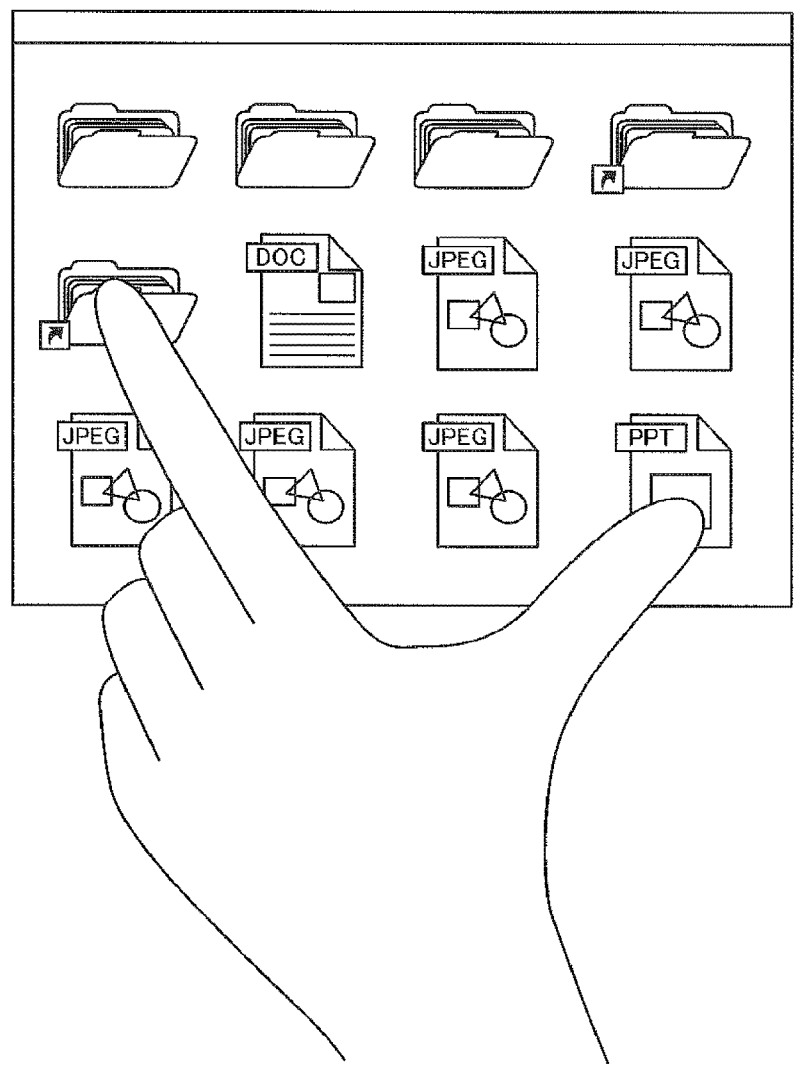
FIG. 21 is a diagram of an exemplary screen output at the time of selecting the object according to the modification of the present invention.

For example, as illustrated in FIGS. 21 and 22(*a*), when the type of the object included in the selection range G27 is "folder", "DOC file", "JPEG file", and "PPT file", the object selecting unit 24 displays a button image G28, which makes the user select the object selection rule, on the touch panel display. At this time, when the user has input the selection rule of "select file only", the object selecting unit 24 selects the object having the type of "DOC file", "JPEG file", and "PPT file" from among the objects included in the selection range G27. On the other hand, when the user has input the selection rule of "select JPEG only", the object selecting unit 24 selects the object having the type of "JPEG file", of which the number is the largest, from among the objects included in the selection range G27 (FIG. 22(*b*)). According to this operation, the object desired by the user can be efficiently selected.

Here, it is preferable that the object selecting unit according to the above-mentioned embodiment sets a first selection range when a plurality of coordinate values has been maintained for a predetermined time, and after that, sets a second selection range when a plurality of coordinate values has been maintained for a predetermined time, and additionally, sets a selection range to select an object by removing or adding the second selection range relative to the first selection range. With the above-mentioned structure, a degree of freedom of the object selection by a continuous operation performed by using a plurality of operating tools can be improved. As a result, the operation at the time of selecting the object can be more efficiently performed.

Also, when recognizing that the first selection range includes the second selection range, it is preferable that the object selecting unit removes the second selection range from the first selection range. In this way, the operation when the object which has been selected once is removed can be efficiently performed.

In addition, when recognizing that the second selection range exists outside the first selection range, it is preferable that the object selecting unit adds the second selection range relative to the first selection range. In this case, the operation at the time of adding the selection of the object can be more efficiently performed.

Also, in addition, it is preferable that the object selecting unit recognizes a type of the object to be selected and change a range of a boundary of the selection range which is set relative to a plurality of coordinate values according to the type. By including this object selecting unit, the selection range according to the type of the object can be appropriately set. As a result, the operation at the time of selecting the object can be more efficiently performed.

Also, it is preferable that the object selecting unit recognizes the type of the object included in the selection range and selects a specific type of object from among the objects included in the selection range according to a predetermined determination rule. With the above-mentioned structure, the object desired by the user can be efficiently selected.

Also, it is preferable that the object selecting unit recognizes a type which is the largest number of types of the objects based on the objects included in the selection range and selects the object of the type from among the objects included in the selection range. In this way, an object desired by the user can be efficiently selected.

Also, it is preferable that the object selecting unit determines the selection of the object included in the selection range when detecting a change of a coordinate value of at least one operating tool from among a plurality of operating tools after the setting of the selection range. Also, it is preferable that the object selecting unit determines the selection of the object included in the selection range when detecting a change of coordinate values of two or more operating tools from among the plurality of operating tools after the setting of the selection range. In this way, the selection range of the object selected by the continuous smooth operation can be determined.

Also, it is preferable that the object selecting unit displays the object so as to move up a part of the object in a range between the coordinate values of one operating tool and the other operating tool when the coordinate value of one operating tool detected by the coordinate detecting unit is maintained and a position indicated by the coordinate value of the other operating tool detected by the coordinate detecting unit is changed to be closer to a position indicated by the coordinate value of one operating tool. With the above-mentioned structure, when it is desired to select a wider range of the object, the selection range can be easily set by using the plurality of operating tools. Also, the operation at that time can be realized by an intuitive operation.

INDUSTRIAL APPLICABILITY

An application of the present invention is a terminal device and a method for selecting an object. According to the present invention, in a case where the object is selected on a touch panel display, a selection range can be accurately defined by an intuitive operation.

REFERENCE SIGNS LIST

1 . . . terminal device, 21 . . . touch panel display, 23 . . . coordinate sensing unit (coordinate detecting means), 24 . . . object selecting unit (object selecting means)

The invention claimed is:
1. A terminal device comprising:
a touch panel display configured to display an object and sense proximity or contact of an operating tool; and
circuitry configured to
detect a coordinate value which is an approaching position of the operating tool or a contacting position of the operating tool to the touch panel display,
set a selection range defined by the coordinate values of a plurality of operating tools and select the object included in the selection range when the coordinate values of a plurality of operating tools have been concurrently maintained for a predetermined time, wherein
the circuitry is configured to
set a first selection range when a plurality of the coordinate values has been maintained for a predetermined time, and after that, set a second selection range when a plurality of the coordinate values has been maintained for a predetermined time, and additionally, set the selection range to select the object by removing or adding the second selection range relative to the first selection range; and
remove the second selection range from the first selection range when it has been recognized that the first selection range includes the second selection range.
2. A terminal device comprising:
a touch panel display configured to display an object and sense proximity or contact of an operating tool; and
circuitry configured to
detect a coordinate value which is an approaching position of the operating tool or a contacting position of the operating tool to the touch panel display,
set a selection range defined by the coordinate values of a plurality of operating tools and select the object included in the selection range when the coordinate values of a plurality of operating tools have been concurrently maintained for a predetermined time, wherein
the circuitry is configured to
set a first selection range when a plurality of the coordinate values has been maintained for a predetermined time, and after that, set a second selection range when a plurality of the coordinate values has been maintained for a predetermined time, and additionally, set the selection range to select the object by removing or adding the second selection range relative to the first selection range; and
add the second selection range relative to the first selection range when it has been recognized that the second selection range exists outside the first selection range.
3. The terminal device according to claim 1, wherein
the circuitry is configured to recognize a type of an object to be selected and change a range of a boundary of the selection range which is set relative to a plurality of the coordinate values according to the type.
4. The terminal device according to claim 1, wherein
the circuitry is configured to recognize a type of an object included in the selection range and select a specific type of object from among the objects included in the selection range according to a predetermined determination rule.
5. The terminal device according to claim 4, wherein
the circuitry is configured to recognize a type of the largest number of types of the objects based on the objects included in the selection range and select the object of the type from among the objects included in the selection range.
6. The terminal device according to claim 1, wherein
the circuitry is configured to determine the selection of the object included in the selection range when detecting a change of the coordinate value of at least one operating tool from among the plurality of operating tools after the setting of the selection range.

7. The terminal device according to claim 1, wherein
the circuitry is configured to determine the selection of the object included in the selection range when detecting a change of the coordinate values of the two or more operating tools from among the plurality of operating tools after the setting of the selection range.

8. The terminal device according to claim 1, wherein
the circuitry is configured to display the object so as to move up a part of the object in a range between the coordinate values of one operating tool and the other operating tool when the coordinate value of one operating tool is maintained and a position indicated by the coordinate value of the other operating tool is changed to be closer to a position indicated by the coordinate value of one operating tool.

9. A method for selecting an object comprising:
an input/output step in which a touch panel display displays an object and senses proximity or contact of an operating tool;
a coordinate detection step in which circuitry detects a coordinate value which is an approaching position of the operating tool or a contacting position of the operating tool to the touch panel display; and
an object selection step in which the circuitry
sets a selection range defined by the coordinate values of a plurality of operating tools and selects the object included in the selection range when the coordinate values of the plurality of operating tools detected by the coordinate detecting means have been concurrently maintained for a predetermined time;
sets a first selection range when a plurality of the coordinate values has been maintained for a predetermined time, and after that, set a second selection range when a plurality of the coordinate values has been maintained for a predetermined time, and additionally, set the selection range to select the object by removing or adding the second selection range relative to the first selection range; and
removes the second selection range from the first selection range when it has been recognized that the first selection range includes the second selection range; or
adds the second selection range relative to the first selection range when it has been recognized that the second selection range exists outside the first selection range.

* * * * *